(12) United States Patent
Hasegawa

(10) Patent No.: US 12,373,145 B2
(45) Date of Patent: Jul. 29, 2025

(54) PRINTING SYSTEM, INFORMATION PROCESSING DEVICE, AND JOB SETTING METHOD

(71) Applicant: SHARP KABUSHIKI KAISHA, Sakai (JP)

(72) Inventor: Kazunori Hasegawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/404,428

(22) Filed: Jan. 4, 2024

(65) Prior Publication Data

US 2024/0281177 A1  Aug. 22, 2024

(30) Foreign Application Priority Data

Feb. 20, 2023 (JP) ................. 2023-024505

(51) Int. Cl.
*G06F 3/12* (2006.01)
*B42C 3/00* (2006.01)

(52) U.S. Cl.
CPC ............. *G06F 3/1208* (2013.01); *B42C 3/00* (2013.01); *G06F 3/1253* (2013.01); *G06F 3/1264* (2013.01)

(58) Field of Classification Search
None
See application file for complete search history.

(56) References Cited

U.S. PATENT DOCUMENTS

| 2006/0159480 A1* | 7/2006 | Mima | G03G 15/00 399/82 |
| 2015/0123343 A1* | 5/2015 | Sei | B65H 29/58 271/290 |
| 2019/0281169 A1* | 9/2019 | Kawasaki | H04N 1/00639 |

FOREIGN PATENT DOCUMENTS

JP  2014-227236 A  12/2014

* cited by examiner

*Primary Examiner* — Darryl V Dottin
(74) *Attorney, Agent, or Firm* — ScienBiziP, P.C.

(57) ABSTRACT

A printing system includes: a driver that accepts a user operation related to setting of a print job and provides an instruction related to the print job; a printing unit that performs cover/interleaving paper printing in which printing is performed with at least a cover or an interleaving paper inserted, on the basis of the instruction; a booklet creating unit that performs booklet creation processing of creating a booklet by center-folding the cover and sandwiching other center-folding printed papers, on the basis of the instruction; and a pre-processing unit that performs processing of making a linear bending mark or a folding mark as pre-processing at a position on the cover, before the center-folding, at which the center-folding is to be performed, on the basis of the instruction.

12 Claims, 15 Drawing Sheets

PRINTING SYSTEM, INFORMATION PROCESSING DEVICE, AND JOB SETTING METHOD

TECHNICAL FIELD

The present disclosure relates to a printing system, an information processing device, and a job setting method capable of setting printing in which at least a cover or an interleaving paper is inserted in accordance with setting and saddle stitch printing.

BACKGROUND ART

In recent years, image forming devices including a function of automating bookbinding printing have appeared. Image forming devices that perform a large amount of printing involving complicated finishing processing in a short amount of time have been gaining acceptance in the market. Various peripheral devices may be connected to such image forming devices.

For example, a sheet processing device is known including a folding groove forming means that forms a streak-like folding groove in a first surface of a transported sheet and a folding means that folds the sheet with the folding groove formed by the folding groove forming means along the folding groove. During bookbinding processing, the sheet processing device brings a plurality of sheets together in a bundle, saddle-stitches the sheet bundle, and folds the saddle-stitched sheet bundle into half at a center thereof. When folding the sheet bundle into half, the sheet bundle is sometimes folded insufficiently depending on the thickness thereof. Cracking may also occur in a spine when thick sheets are folded. The folding groove forming means creates the folding streak, which is a streak-like groove, in advance at the sheet folding portion before folding processing of folding the sheet bundle into half for this reason. When a sheet after the streak creation processing is transported to the processing tray, the sheet is transported while coming into contact with sheets that have already been stacked on the processing tray. In that case, a protruding portion may be formed in a second surface on the side opposite to the first surface of the sheet due to the streak creation processing, and a leading end of the next sheet may get caught on the protruding portion formed in the sheet when the sheet is transported to the processing tray, causing misalignment of the sheet or paper clogging. In order to solve such a problem, a smashing means that smashes the protruding portion produced in the second surface through streak creation processing is provided.

SUMMARY OF THE INVENTION

Although center-folding becomes insufficient if the sheet bundle is excessively thick, other adverse effects may occur if the folding groove is provided in each sheet to handle this. However, ordinary printing sheets are thin, and it is possible to center-fold the printing sheets even if the folding grooves are not formed in all the sheets. If the thickness increases to a level at which the centerfolding cannot satisfactorily be performed, other problems—may occur such as finishing of the saddle stitching not being esthetically pleasing or the saddle stitching coming off. Methods of binding other than the saddle stitching, for example, side stitching and adhesive binding rather than forcedly choosing the saddle stitching work out better in many cases.

However, the present inventors have experienced that toner at a spine part of a printed cover and bent parts between the spine and sides peel off during use in a case where thick paper is used for the cover even if a sheet bundle is not very thick.

The present disclosure was made in consideration of the aforementioned circumstances and provides a method for curbing toner peeling at a spine part of a cover in a case of printing in which a thick sheet is used for the cover and the cover is center-folded.

The present disclosure provides a printing system including: a driver that accepts a user operation related to setting of a print job and provides an instruction related to the print job; a printing unit that performs cover/interleaving paper printing in which printing is performed with at least a cover or an interleaving paper inserted, on the basis of the instruction; a booklet creating unit that performs booklet creation processing of creating a booklet by center-folding the cover and sandwiching other center-folding printed papers, on the basis of the instruction; and a pre-processing unit that performs processing of making a linear bending mark or a folding mark as pre-processing at a position on the cover, before the center-folding, at which the center-folding is to be performed, on the basis of the instruction.

From another viewpoint, the present disclosure provides an information processing device in which a driver in installed that causes an image forming device including a printing unit, a booklet creating unit, and a pre-processing unit to execute a print job. The driver: causes an operation screen related to setting of the print job to be displayed; accepts a user operation; accepts, on the operation screen, setting related to center-folding printing in which printed papers are center-folded by using the booklet creating unit and setting related to cover/interleaving paper printing; and accepts setting of combining pre-processing of making a linear bending mark or a folding mark on a cover by using the pre-processing unit with the center-folding printing in a state where the cover/interleaving paper printing has been selected, or does not accept the setting of combining the pre-processing with the center-folding printing in a state where the cover/interleaving paper printing has not been selected.

From a different viewpoint, the present disclosure provides a job setting method including: accepting a user operation related to setting of a print job; providing an instruction for cover/interleaving paper printing in which printing is performed with at least a cover or an interleaving paper inserted into a printing unit, on the basis of the accepted setting; providing, to a booklet creating unit, an instruction for creating a booklet by center-folding the cover and sandwiching other center-folding printed papers, on the basis of the setting; and providing, to a pre-processing unit, an instruction for performing processing of making a linear bending mark or a folding mark as pre-processing at a position on the cover, before the center-folding, at which the center-folding is to be performed, on the basis of the setting.

In the printing system according to the present disclosure, the driver causes the pre-processing unit to perform the process of forming the linear bend line or the fold line at the center-folding position on the cover as the pre-processing. Therefore, in a case where saddle stitch printing is performed using a thick sheet as the cover, it is possible to suppress peeling off of the toner from the spine portion of the cover.

The information processing device and the job setting method according to the present disclosure also exhibit the same effects and advantages.

DESCRIPTION OF EMBODIMENTS

Hereinafter, the present disclosure will be described in further detail by using the drawings. Note that the following description is in all aspects illustrative and it should not be understood as limiting the present disclosure.

Figure 1:
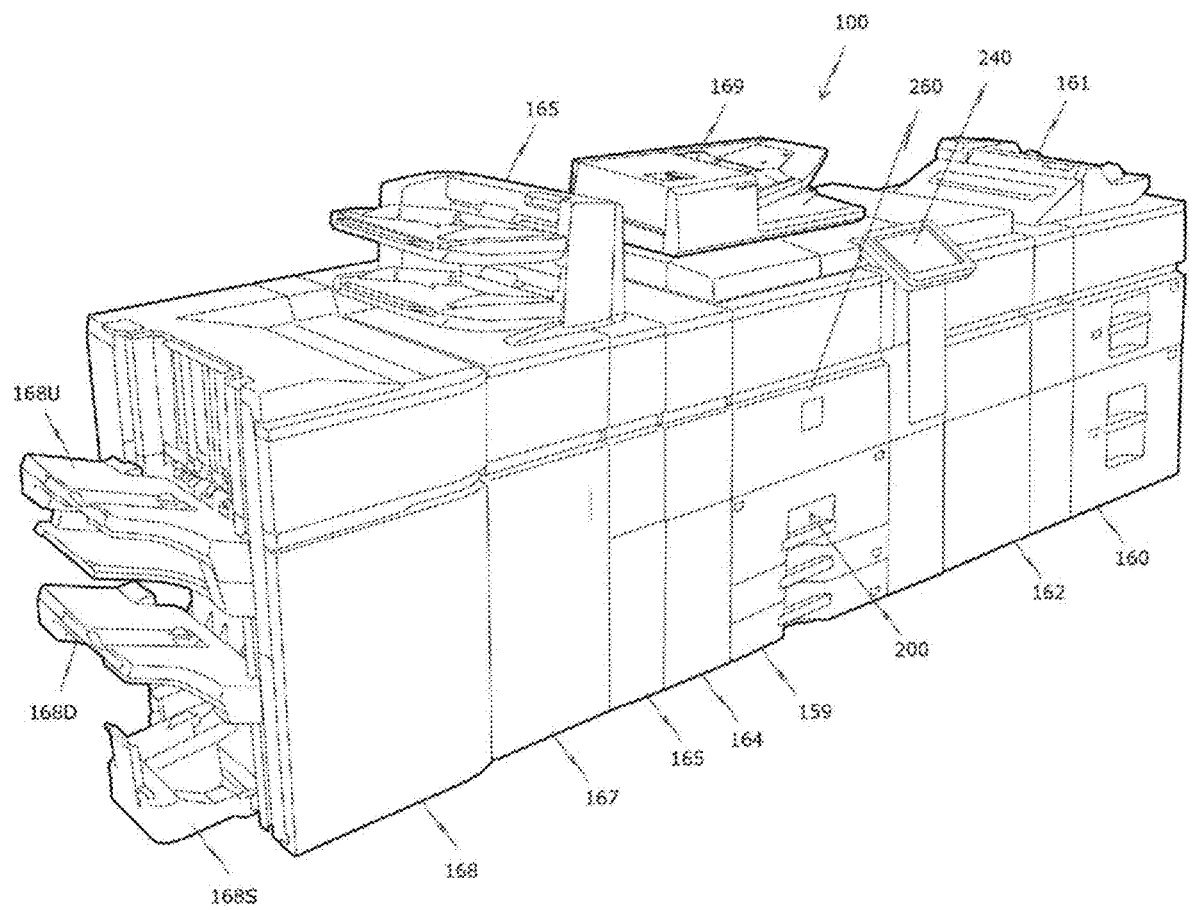
FIG. 1 is an explanatory diagram illustrating an appearance of a multifunction machine seen obliquely from a front left side as an example of a device that includes a printing unit, a saddle stitching unit and a pre-processing unit, and executes print jobs according to the present disclosure.
Figure 2:
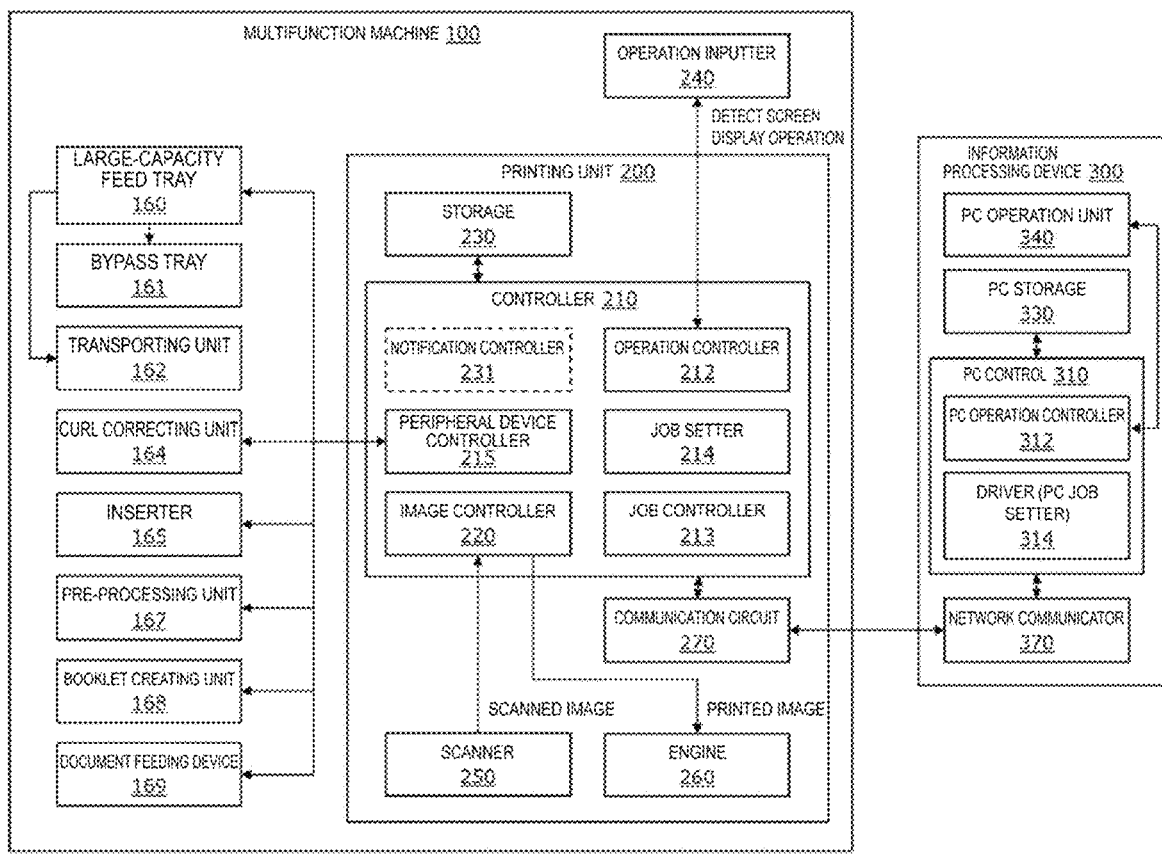
FIG. 2 is a block diagram illustrating a configuration of the multifunction machine illustrated in FIG. 1 and an information processing device capable of communicating with the multifunction machine.

FIG. 1 is an explanatory diagram illustrating an appearance of a multifunction machine seen from a front obliquely left side as an example of an image forming device that includes a printing unit, a saddle stitching unit and a pre-processing unit, and executes print jobs according to the present disclosure. FIG. 2 is a block diagram illustrating a configuration of the multifunction machine illustrated in FIG. 1 and an information processing device capable of communicating with the multifunction machine.

In a multifunction machine 100 illustrated in FIG. 1, peripheral devices are connected to a printing unit 200 being a main device. The printing unit 200 includes a document feeding device 169, a main body feed tray 159, an engine 260 that forms images, and an operation inputter 240.

On the right side of the printing unit 200 seen from the front side, a large-capacity feed tray 160, a bypass tray 161, and a transporting unit 162 are coupled. On the left side of the printing unit 200 seen from the front side, a curl correcting unit 164, an inserter 165, a pre-processing unit 167, and a saddle finisher being a booklet creating unit 168 are coupled.

The pre-processing unit 167 can not only make a folding mark in a cover as pre-processing but also perform two-hole punching and multiple-hole punching, and the processing can be alternatively executed.

The printing unit 200 includes a scanner 250 that reads images on documents and the engine 260 that forms images.

A controller 210 that controls operations and processing of the multifunction machine 100 is included. The controller 210 mainly includes a processor and also circuits such as an input/output circuit and a timer circuit as hardware.

Furthermore, the printing unit 200 includes a storage 230 including a RAM and a non-volatile memory.

Also, the printing unit 200 includes a communication circuit 270 that communicates with external devices such as an information processing device 300, and the operation inputter 240 related to a user interface.

The processor of the controller 210 realizes functions of an operation controller 212, a job controller 213, a peripheral device controller 215, an image controller 220, and a job setter 214 illustrated in FIG. 2 by executing a control program stored in advance in the storage 230. The processor may realize any of functions of a notification controller 231.

The operation controller 212 causes the operation inputter 240 to display an operation screen, recognizes a user operation performed on the operation screen, and performs processing in accordance with the operation.

The job controller 213 controls execution of jobs using the scanner 250 and the engine 260, for example. The job controller 213 controls execution of print jobs according to the present disclosure.

The peripheral device controller 215 controls peripheral devices including the large-capacity feed tray 160 connected to the printing unit 200, as well as the pre-processing unit 167, the saddle finisher being the booklet creating unit 168, and the like. The image controller 220 processes images on documents read by the scanner 250. The image controller 220 processes printing data and generates image data that the engine 260 is to be caused to print. The print data is received from the information processing device 300 via the communication circuit 270 in a case of a print job, for example. In a case of a copy job, for example, the print data is read by the scanner 250 and is created by the image controller 220.

The information processing device 300 illustrated in FIG. 2 is an external device capable of communicating with the multifunction machine 100, accepts setting by a user for jobs the multifunction machine 100 is to execute, and transmits the setting to the multifunction machine 100. In FIG. 2, a personal computer (PC) is assumed as an example of a specific aspect of the information processing device 300. However, the information processing device 300 is not limited to the PC and may be, for example, a smartphone, or a tablet terminal. The information processing device 300 illustrated in FIG. 2 includes a PC controller 310, a PC storage 330, a PC operation inputter 340, and a network communicator 370.

The PC controller 310 includes a circuit mainly including a processor as hardware and executes programs such as an operation system, an APP, and a driver stored in the PC storage 330.

The information processing device 300 includes the PC storage 330 including a RAM and a non-volatile memory. The PC storage 330 stores programs and data of the aforementioned operation system, APP, and the like.

The information processing device 300 includes the network communicator 370 that communicates with external devices such as the multifunction machine 100 and the PC operation inputter 340 related to a user interface.

The processor of the PC controller 310 receives a user operation related to a job that the multifunction machine 100 is to be caused to execute, by executing the program stored in the PC storage 330. The processor executes processing as a printer driver and a scanner driver. The processor realizes functions of a PC operation controller 312 and a PC job setter 314 illustrated in FIG. 2.

The PC operation inputter 340 displays an operation screen on the PC operation inputter 340, recognizes a user operation performed on the operation screen, and performs processing in accordance with the operation.

The PC job setter 314 is a driver and controls execution of jobs using the scanner 250 as the scanner driver, for example. The PC job setter 314 controls execution of jobs using the engine 260 as the printer driver. The job controller 213 controls execution of print jobs according to the present disclosure. The PC operation inputter 340 displays an operation screen (scanner driver screen) related to a scan job using the scanner 250 on the PC operation inputter 340 and receives a user operation. The PC operation inputter 340 displays an operation screen (printer driver screen) of the printer driver on the PC operation inputter 340 in regard to print jobs using the engine 260 and receives a user operation. These operations screens (the scanner driver screen and the printer driver screen) are provided by the PC job setter 314.

The print jobs described in the specification collectively refer to jobs related to printing, and the aforementioned print jobs and the copy jobs are included in the print jobs. The job setter performs setting of jobs that the multifunction machine 100 is to be caused to execute. In the case of the aforementioned print job, the information processing device 300 illustrated in FIG. 2 accepts setting by a user related to the print job. Therefore, in the case of the print job, the job setter according to the present disclosure is present as a driver in the information processing device 300, and the aforementioned PC job setter 314 corresponds to the driver. This is assumed to be a basic aspect (first embodiment) of the present disclosure.

On the other hand, the controller 210 accepts setting by a user related to a copy job via the operation inputter 240 for the aforementioned copy job. Therefore, in the case of the copy job, the job setter according to the present disclosure is present in the printing unit 200, and the aforementioned job setter 214 corresponds thereto. In contrast to the aforementioned first embodiment, this is assumed to be a second embodiment of the present disclosure. Although there are differences between the first embodiment and the second embodiment in job types, locations where job setters are present, and operation inputters to receive instructions, flows of the processing correspond to each other, and the print job in the first embodiment will thus be explained in the following description. It should be easy for those skilled in the art to apply the description to the second embodiment.

Note that although FIGS. 1 and 2 illustrate an aspect in which the booklet creating unit 168 and the pre-processing unit 167 being peripheral devices are connected to the printing unit 200 being a main device, these may be configured as a single device.

According to the aspect, the job setting device can provide an instruction for a print job regardless of whether the printing unit, the booklet creating unit, and the pre-processing unit are an integrally configured device or devices configured as separate units.

Toner Peeling at Cover Spine Part and Method of Binding Booklet Before describing details of the processing, toner peeling at the spine part of the center-folding (saddle stitch) related to the problem to be solved by the present disclosure will be described.

Figure 3:
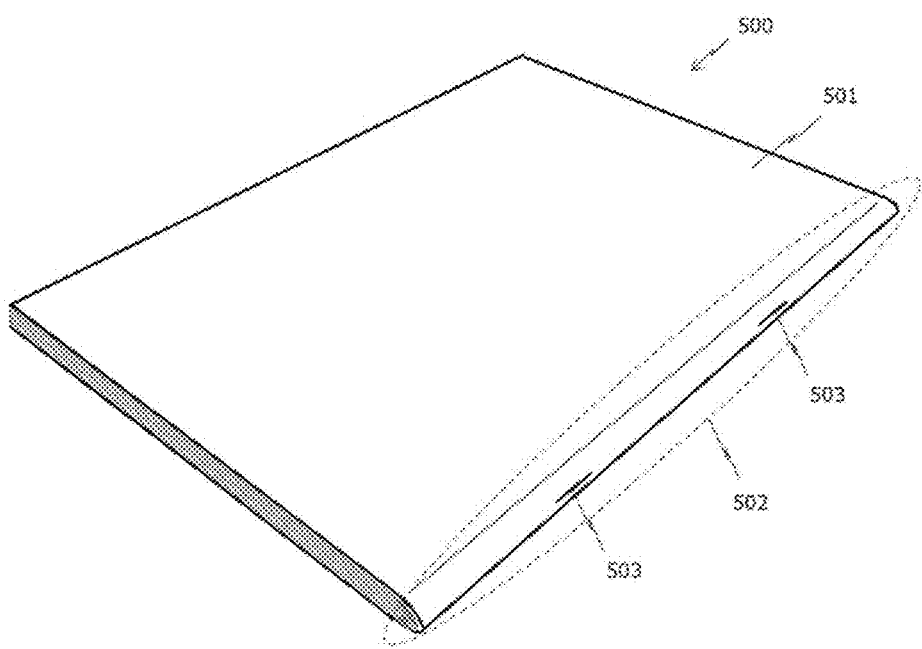
FIG. 3 is a perspective view illustrating an example of a saddle-stitched booklet produced by the multifunction machine illustrated in FIG. 1.

FIG. 3 is a perspective view illustrating an example of a saddle-stitched booklet 500 created by the multifunction machine 100. A spine part 502 of the center-folded sheet bundle of overlapping sheets has been bound with staples 503. The outer side of the booklet 500 of the overlapping center-folded sheets is a cover 501. In a case where a thick paper is used as the cover 501 and printing is performed on a region including the spine part 502, toner on the surface may partially peel off or cracking may occur in a toner layer when the cover 501 is center-folded and the spine part 502 is bent. This is toner peeling described in the specification. There is a trend that toner peeling is likely to occur in a case where the toner layer is formed on the entire surface of the spine part 502 on which printing has been performed in order to apply a base color or an image to the cover 501, in particular.

In the description of FIG. 1, the booklet creating unit 168 has been described specifically as a saddle finisher. The saddle finisher has widely been distributed as a peripheral device of an image forming device to create saddle-stitched booklets. However, the nature of the present disclosure is not limited to the saddle finisher. Although saddle stitching is a representative method of binding booklets, side stitching, adhesive binding, and the like as well as the saddle stitching are known.

Figure 4A:
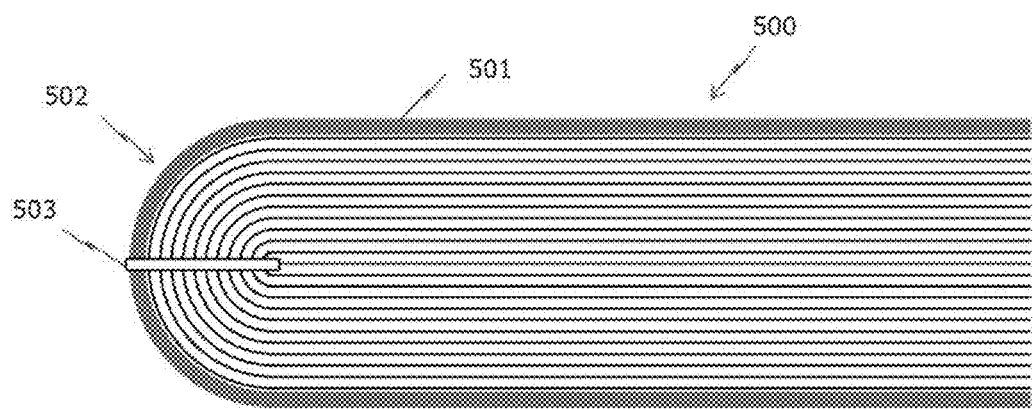
FIG. 4A is a sectional view illustrating a method of binding a saddle-stitched booklet according to the present disclosure.

FIG. 4A is a sectional view illustrating a method of binding the saddle-stitched booklet 500. Saddle stitching is a binding method of stacking a cover and papers other than the cover, stapling the cover and the papers at the center corresponding to the spine part, and center-folding the cover and the papers. Although the staples 503 are provided at two locations in many cases, staples 503 may be provided at three locations, for example, in accordance with the length of the spine part 502. As illustrated in FIG. 4A, the provided staples 503 are exposed from the spine part 502 of the cover 501. The spine part of the cover 501 is bent in accordance with the thickness of the booklet. Although the spine part is depicted as an arc in FIG. 4A, the ridgeline part from which the staples 503 are exposed is often tapered in practice. Toner peeling is likely to occur at the ridgeline part, boundaries between the spine part 502 and flat parts (called "sides") that continue from the spin part 502 on both sides, and the like.

On the other hand, side stitching is achieved by binding, with the staples 503, a bundle in a state where several sets of center-folded papers other than a cover are stacked.

Figure 4B:
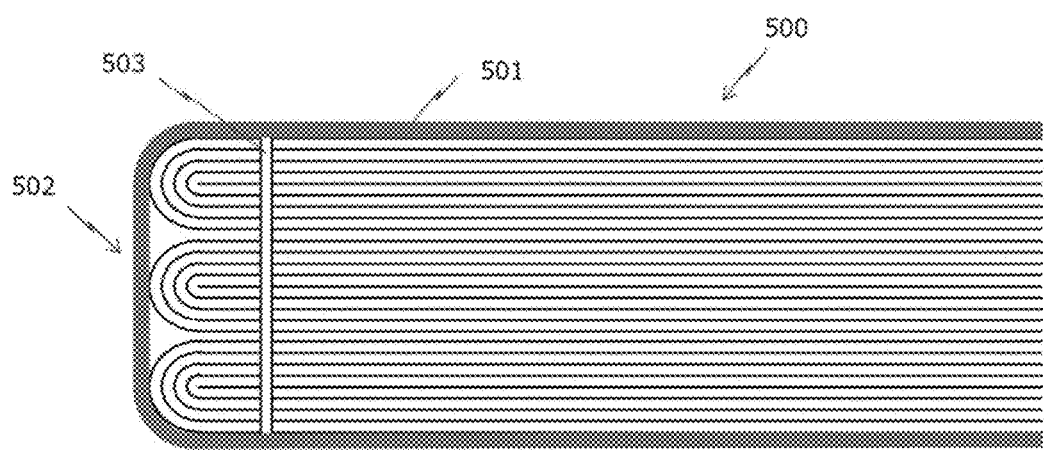
FIG. 4B is a sectional view illustrating a method of binding a side-stitched booklet according to the present disclosure.
Figure 4C:
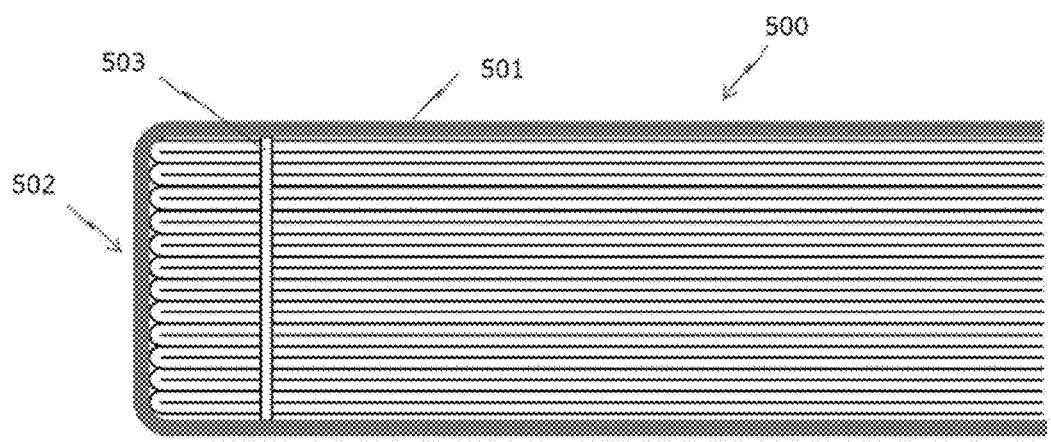
FIG. 4C is a sectional view illustrating a method different from that in FIG. 4B of binding a side-stitched booklet according to the present disclosure.

FIG. 4B illustrates an example of side stitching in which center-folded papers are a plurality of papers. FIG. 4C illustrates an example of side stitching in which a center-folded paper is a single paper. The staples 503 in both FIGS.

4B and 4C are exposed from a side part near the spine part 502 rather than the spine part 502. The cover 501 is glued to the spine part 502 of the bundle of the stapled papers and covers the paper bundle.

As illustrated in FIGS. 4B and 4C, the paper bundle other than the cover is stapled in the side stitching. On the other hand, the adhesive binding is a binding method of gluing the center-folded papers and cover at the spine part 502 similar to FIG. 4C. Glue couples each paper instead of the staples 503. The cover 501 is center-folded, and the spine part 502 is bent in the cases of the side stitching and the adhesive binding as well. Toner may partially peel off or cracking may occur in a toner layer at the part where the cover 501 is bent, similar to the case of the saddle stitching.

Note that although the examples of the side stitching and the adhesive binding have been described as examples of binding methods other than the saddle stitching, the present disclosure is not intended to be limited to such binding methods and is intended to be able to be applied to methods of booklet binding other than saddle stitching.

The side stitching, the adhesive binding, and other binding methods are performed by a bookbinding machine and can be applied to the booklet creating unit 168 illustrated in FIGS. 1 and 2. Note that although the aforementioned saddle stitching printing has been described under the assumption that the booklet creating unit 168 staples the center-folded papers, and the same applies to the following description, the scope of the present disclosure also includes an aspect in which the booklet creating unit 168 performs processing up to the center-folding and does not perform stapling, and the aspects will be collectively referred to as center-folding printing.

Folding Mark Making Processing Performed by Pre-Processing Unit

Processing in which the pre-processing unit makes a folding mark on a cover according to the present disclosure will be described.

Figure 5:
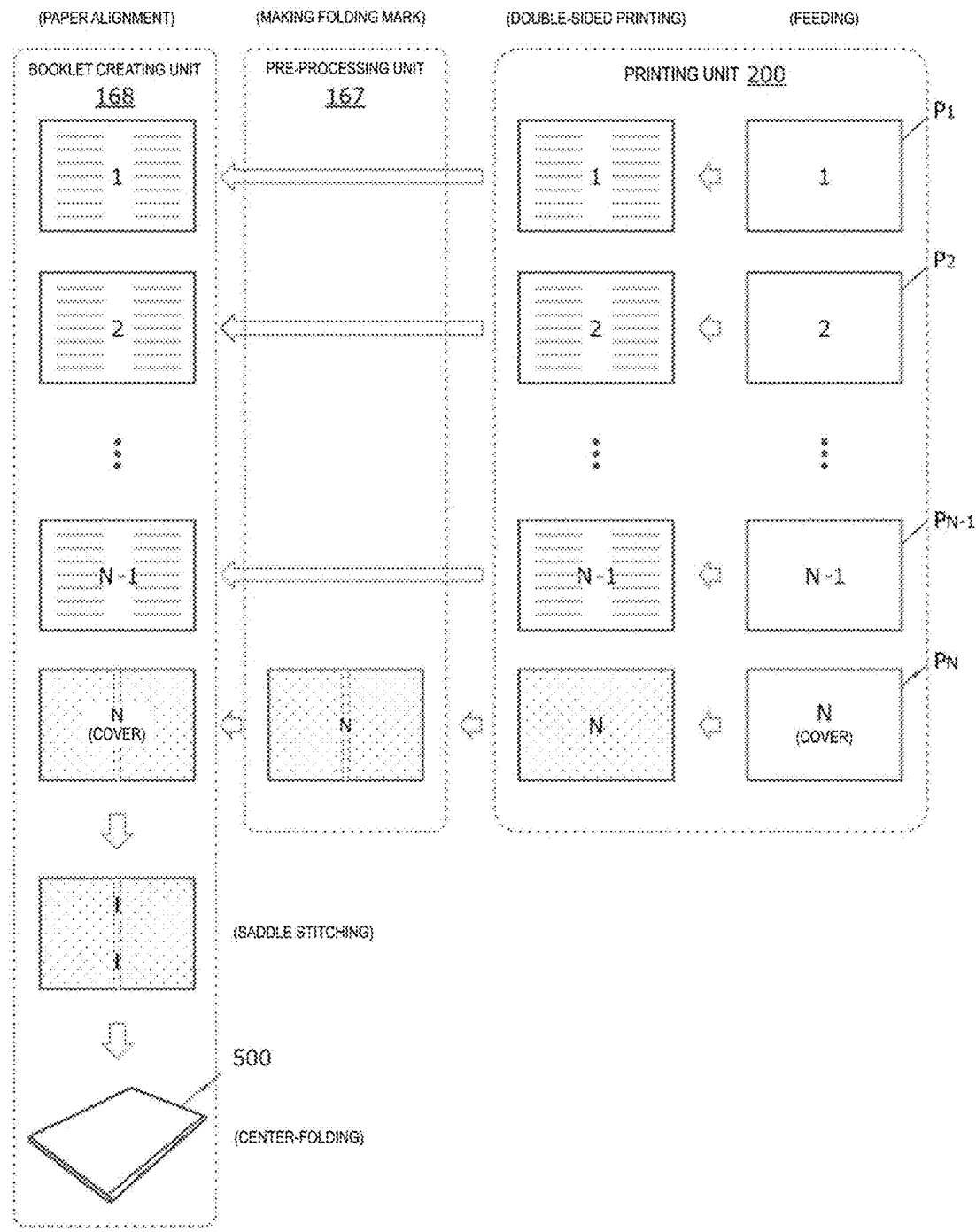
FIG. 5 is an explanatory diagram illustrating a flow of printing in a case where a cover/interleaving paper and saddle stitching are combined in the present disclosure.

FIG. 5 is an explanatory diagram illustrating a flow of a print job in a case where the PC job setter 314 being a driver has provided an instruction for a print job of a combination of cover/interleaving paper and saddle stitching in the present disclosure.

In FIG. 5, three dashed-line frames illustrate processing performed by the printing unit 200, the pre-processing unit 167, and the booklet creating unit 168 when the instruction for a print job is received from the PC job setter 314. Processing performed by the printing unit 200, processing performed by the pre-processing unit 167, and processing performed by the saddle finisher being the booklet creating unit 168 are illustrated in the order from the right dashed-line frame.

$P_1$ to $P_N$ indicate respective sheets. $P_1$ to $P_{N-1}$ are sheets other than the cover, and $P_N$ is the cover. It is assumed that cover/interleaving paper setting designated through the instruction from the PC job setter 314 is for supplying the papers other than the cover from the large-capacity feed tray 160 and supplying the cover from the bypass tray 161. Also, it is assumed that printing is supposed to be performed on the front side of the cover.

The printing unit 200 successively supplies each of the papers $P_1$ to $P_{N-1}$ from the large-capacity feed tray 160 and performs printing on front and rear sides. Finally, $P_N$ (cover) is supplied from the bypass tray 161, and printing is performed on the front side thereof. $P_N$ is a paper corresponding to the cover 501 in a state where the booklet 500 as illustrated in FIG. 3 is finished, and the front side corresponds to the surface of the booklet 500 exposed to the outside of both the front and rear surfaces of the cover 501. In an example, the basis weight (a weight per 1 square meter) of the papers supplied from the large-capacity feed tray 160 is 60 g/m², which corresponds to ordinary papers, and the basis weight of the paper supplied from the bypass tray 161 is 110 g/m², which corresponds to a thick paper.

The pre-processing unit 167 only allows each of the papers $P_1$ to $P_{N-1}$ other than the cover to pass and does not perform any processing thereon. For $P_N$ (cover), a folding mark is made at the position of the center-folding or a spine part near the position.

According to the aspect, the pre-processing unit can make a bending mark or a folding mark at and near the position of the center-folding of the cover before the center-folding.

Figure 6:
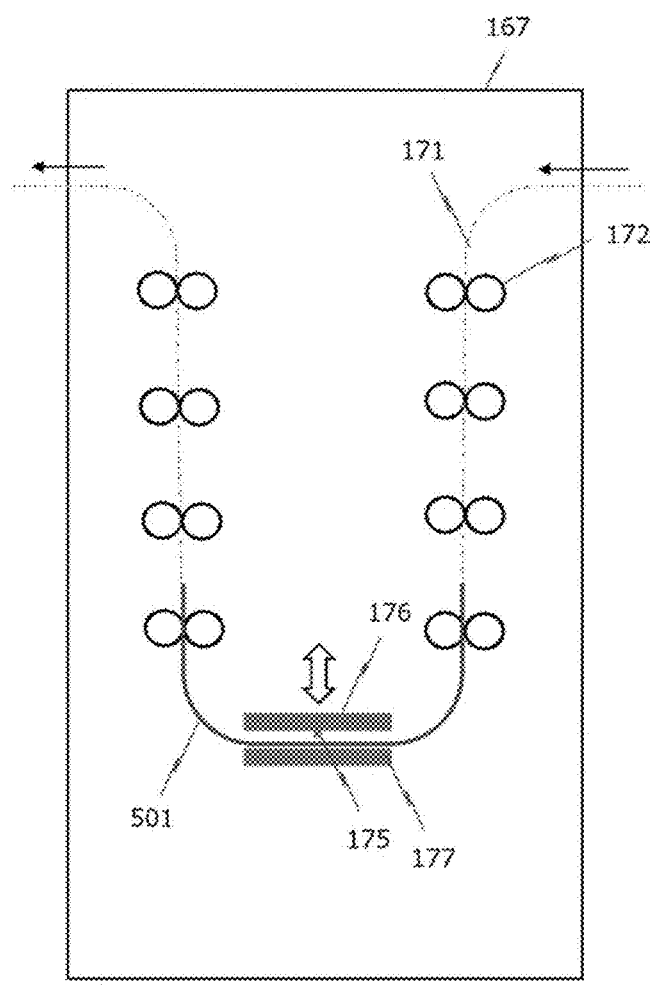
FIG. 6 is an explanatory diagram illustrating an operation of the pre-processing unit illustrated in FIG. 1 making a folding mark in a paper.

FIG. 6 is an explanatory diagram illustrating an operation of the pre-processing unit 167 making a folding mark in the cover 501. As illustrated in FIG. 6, the pre-processing unit 167 has a U-shaped transport path 171 in which a plurality of transport rollers 172 are aligned. A pressing member 176 having a protruding portion 175 and a receiving member 177 are disposed with a bottom portion of the U-shaped transport path 171 sandwiched therebetween. The pressing member 176 including the protruding portion 175 is a hard member made of steel, for example, and can move in the up-down direction by an eccentric cam, a spring, and the like, which are not illustrated in FIG. 6 (see the arrow in FIG. 6). The receiving member 177 facing the pressing member 176 with the bottom portion of the U-shaped transport path 171 sandwiched therebetween is a flexible member made of rubber or the like, and the position thereof is fixed.

The peripheral device controller 215 guides the cover 501 from the printing unit 200 to the transport path 171. When a sensor, which is not illustrated in FIG. 6, detects that the center has reached the position (see the cover 501 illustrated in FIG. 6) at which the cover passes below the protruding portion 175, the transport of the cover 501 is stopped once, and the pressing member 176 is lowered and is caused to press the pressing member 176 via the cover 501. In this manner, a linear bending mark or folding mark is made with the cover 501 sandwiched between the pressing member 176 and the receiving member 177. Thereafter, the pressing member 176 is lifted, and the transport of the cover 501 is started again.

Note that the number of times the operation of sandwiching the cover 501 between the pressing member 176 and the receiving member 177 is performed is not limited to one and the operation may be performed a plurality of times. For example, this is effective in a case where the cover is a very thick paper. The position at which the cover 501 is sandwiched between the pressing member 176 and the receiving member 177 is not limited to only one location, and an aspect in which the sandwiching is performed at a plurality of locations may also be employed. This is effective in a case where the booklet is thick.

According to the aspect, the pre-processing unit can make a linear bending mark or folding mark on the cover before the center-folding through the operation of sandwiching the front and rear sides of the cover one or more times. According to the aspect, the pre-processing unit can make a linear bending mark or folding mark at one or more locations including the center-folding position and locations near the center-folding position on the cover before the center-folding.

Returning to the description of FIG. 5, once the saddle finisher being the booklet creating unit 168 successively receives each of the papers $P_1$ to $P_N$ from the pre-processing unit 167, the booklet creating unit 168 stacks and aligns the papers, binds the papers with the staples 503 at two center locations, and center-folds the papers. The saddle-stitched booklet 500 illustrated in FIG. 5 is thus obtained.

In the embodiment described above, the cover 501 is a thick paper, while the other papers are ordinary papers that are thinner than the cover 501. According to the aspect, the pre-processing unit 167 does not make a folding mark on the papers other than the cover, the protruding portion due to streak making processing is not formed as described in Patent Literature 1, and adverse effects such as sheet misalignment and paper clogging due to the formed protruding portion do not occur. Therefore, there is no need to provide a smashing means for smashing the protruding portion. On the other hand, pre-processing of making a folding mark in advance is performed on the cover for which the thick paper is used. If the pre-processing is performed, the spine part 502 is bent twice including the center-folding performed by the saddle finisher. A stress imparted on a toner layer formed at the spine part 502 when the cover 501 is bent is alleviated as compared with a case where the pre-processing is not performed and the cover 501 is center-folded all at once with the saddle finisher. Therefore, toner peeling at the spine part 502 is suppressed.

Operation Screen Provided by PC Job Setter being Driver

Next, a specific example of the job setter that receives a user operation related to print job setting in the present disclosure will be described by presenting an example of a print job. FIGS. 7 to 12 are explanatory diagrams illustrating an example of a printer driver screen, which is an operation screen that the PC job setter 314 of the information processing device 300 causes the PC operation inputter 340 to display.

Figure 7:
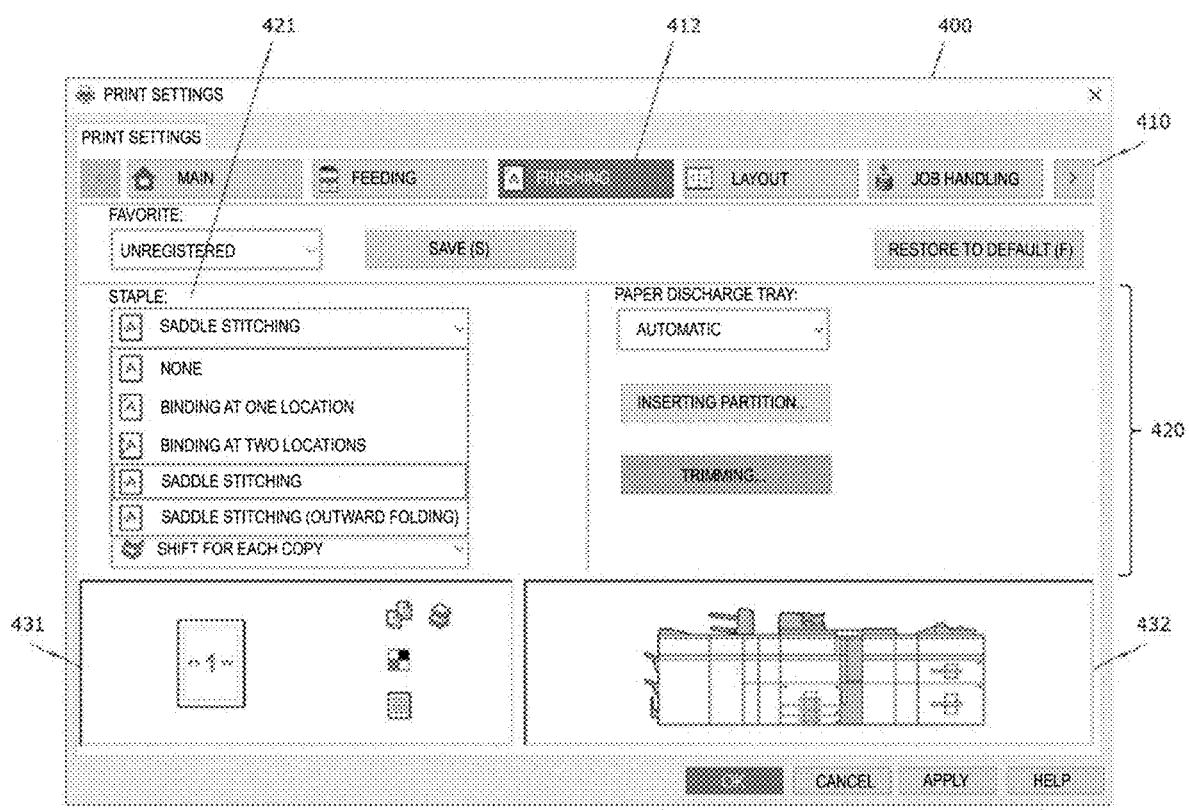
FIG. 7 is an explanatory diagram illustrating an example of options related to stapling setting items in a printer driver screen displayed on a PC operation inputter in FIG. 2.

The operation screen illustrated in FIG. 7 is an example of a printing setting screen related to printing setting. A plurality of tabs 410 for categorized settings for the respective categories are arranged side by side at the upper portion of a printing setting screen 400. Since all the tabs cannot be displayed at once on the printing setting screen 400, it is possible to scroll the tabs by operating scroll buttons at both left and right ends. The PC job setter 314 causes setting items in accordance with a selected tab to be displayed in a setting region 420 in the middle section.

FIG. 7 illustrates a state where a [Finishing] tab 412 has been selected. The PC job setter 314 causes setting items related to finishing to be displayed in the setting region 420. The setting items to be displayed differ in accordance with a configuration of a connected peripheral device. The PC job setter 314 causes a machine illustration 432 indicating the current device configuration to be displayed at the right half in the lower section in the printing setting screen 400. Illustration indicating a printing finished state in accordance with the set function and icons in accordance with finishing setting are caused to be displayed as a printing image 431 at the left half in the lower section.

As illustrated in FIGS. 1 and 2, the pre-processing unit 167 and the saddle finisher being the booklet creating unit 168 are connected as peripheral devices related to finishing. The PC job setter 314 causes staple 421 and shift discharge 423 (see FIG. 12) as setting items related to the booklet creating unit 168 and punch/folding mark 422 (see FIG. 8) as a setting item related to the pre-processing unit 167 to be displayed at the left half of the setting region 420. Setting regarding which of three discharge destinations of the booklet creating unit 168 the papers are to be discharged is caused to be displayed at the right half in the setting region 420. The three discharge destinations are an upper tray 168U, a lower tray 168D, and a saddle stitch tray 168S as illustrated in FIG. 1. Note that the saddle stitch tray 168S is the discharge destination in a case where saddle stitching is performed.

FIG. 7 illustrates options of setting items for the staple 421 among these setting items. The options include binding at one location, binding at two locations, saddle binding, and saddle stitching (outward folding). An option related to the present disclosure among the options is saddle stitching. FIG. 7 illustrates a state in which saddle stitching has been selected.

Figure 8:
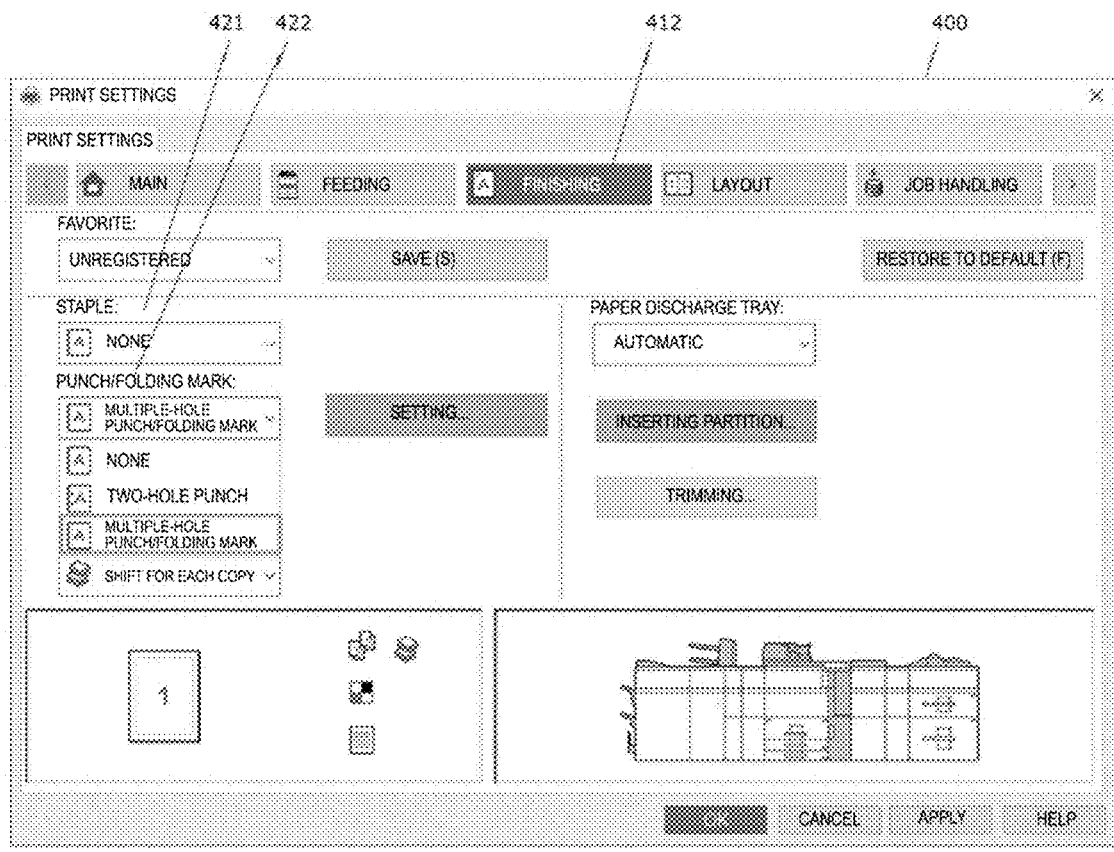
FIG. 8 is an explanatory diagram illustrating an example of options related to punching setting items in the printer driver screen displayed on the PC operation inputter in FIG. 2.

In FIG. 8, the [Finishing] tab 412 has been selected similar to FIG. 7, and the option of the punch/folding mark 422 among the setting items is illustrated. The pre-processing unit 167 in the embodiment can perform not only processing of making a folding line but also punching processing of a two-hole punch and punching processing of a multiple-hole punch. The multiple-hole punch is an alternative function of making a folding mark. In other words, it is possible to perform punching processing of a multiple-hole punch by exchanging the pressing member 176 for making a folding mark as illustrated in FIG. 6 with a pressing member for the multiple-hole punch. A pressing member for making a perforated line for facilitating separation of the paper may also be prepared in addition to the multiple-hole punch such that perforated line making processing can be performed by exchanging the pressing member. On the other hand, the two-hole punch can be used together with the folding mark making/multiple-hole punch. Although not illustrated in FIG. 6, a mechanism for punching two holes is provided near the pressing member 176, and it is possible to use both together.

Figure 9:
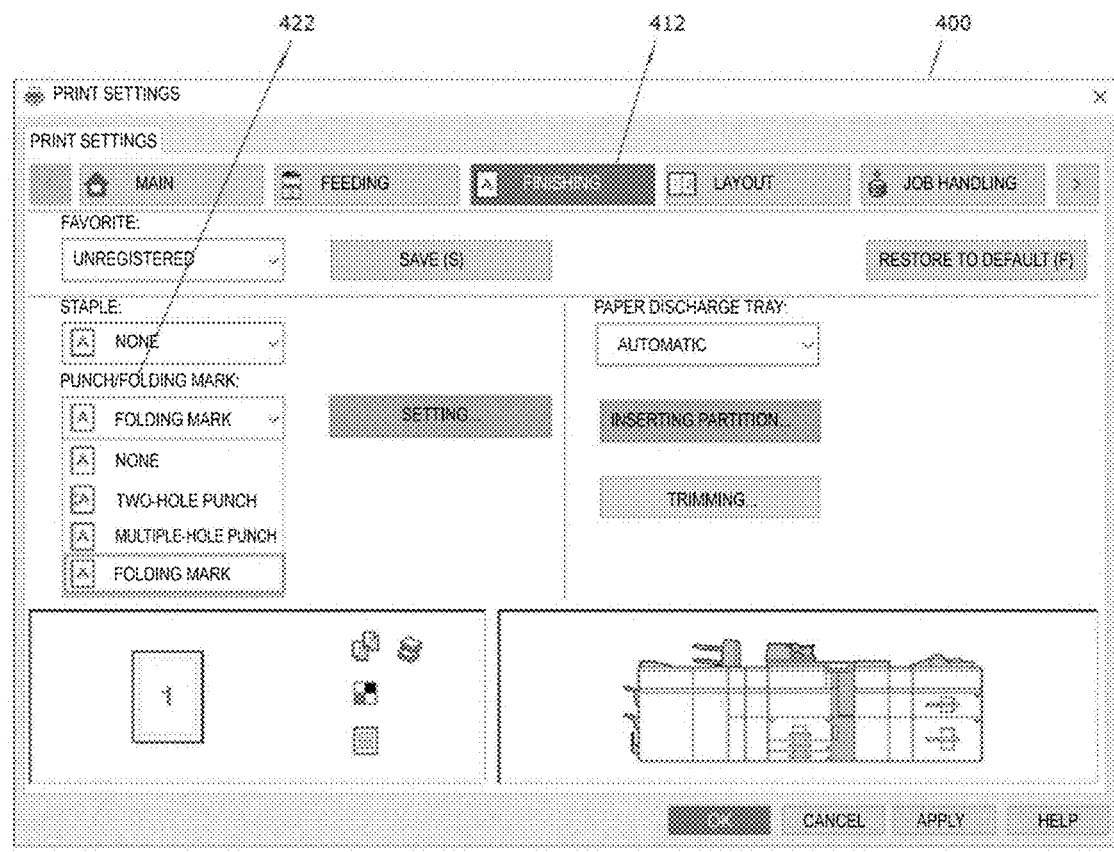
FIG. 9 is an explanatory diagram illustrating an example of options related to punching setting items, which are different from those in FIG. 8, in the printer driver screen displayed on the PC operation inputter in FIG. 2.

Note that it is technically possible to provide the multiple-hole punch and the folding mark making as independent mechanisms, and if such peripheral devices are prepared, it is possible to use both together. FIG. 9 illustrates options of the punch/folding mark 422 corresponding to the peripheral device capable of using the multiple-hole punch and the folding mark making together.

The setting items in the state where the [Finishing] tab 412 has been selected have been described above.

Figure 10:
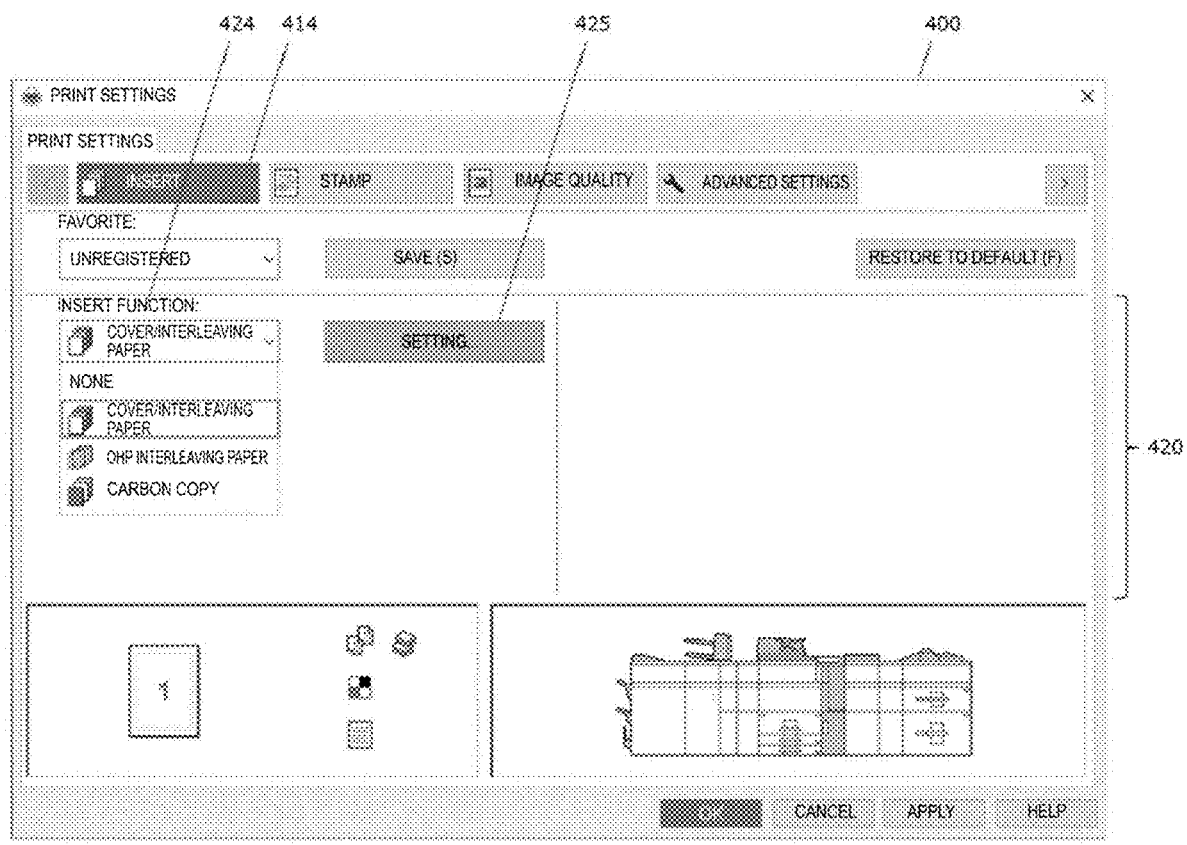
FIG. 10 is an explanatory diagram illustrating options related to insertion function setting items in the printer driver screen displayed on the PC operation inputter in FIG. 2.

FIG. 10 illustrates an example of the setting region 420 in a state where an [Insertion] tab 414 on the printing setting screen 400 has been selected. As illustrated in FIG. 10, the PC job setter 314 causes an insertion function 424 to be displayed as a setting item in the state where the [Insertion] tab 414 has been selected. There are three options as options for the insertion function 424. These are cover/interleaving paper, OHP interleaving paper, and carbon copy. The option related to the present disclosure from among these options is the cover/interleaving paper. FIG. 10 illustrates a state where the cover/interleaving paper has been selected. The PC job setter 314 causes a [Setting] key 425 for performing detailed setting for the cover/interleaving paper to be displayed next to the insertion function 424 on the right side.

Figure 11:
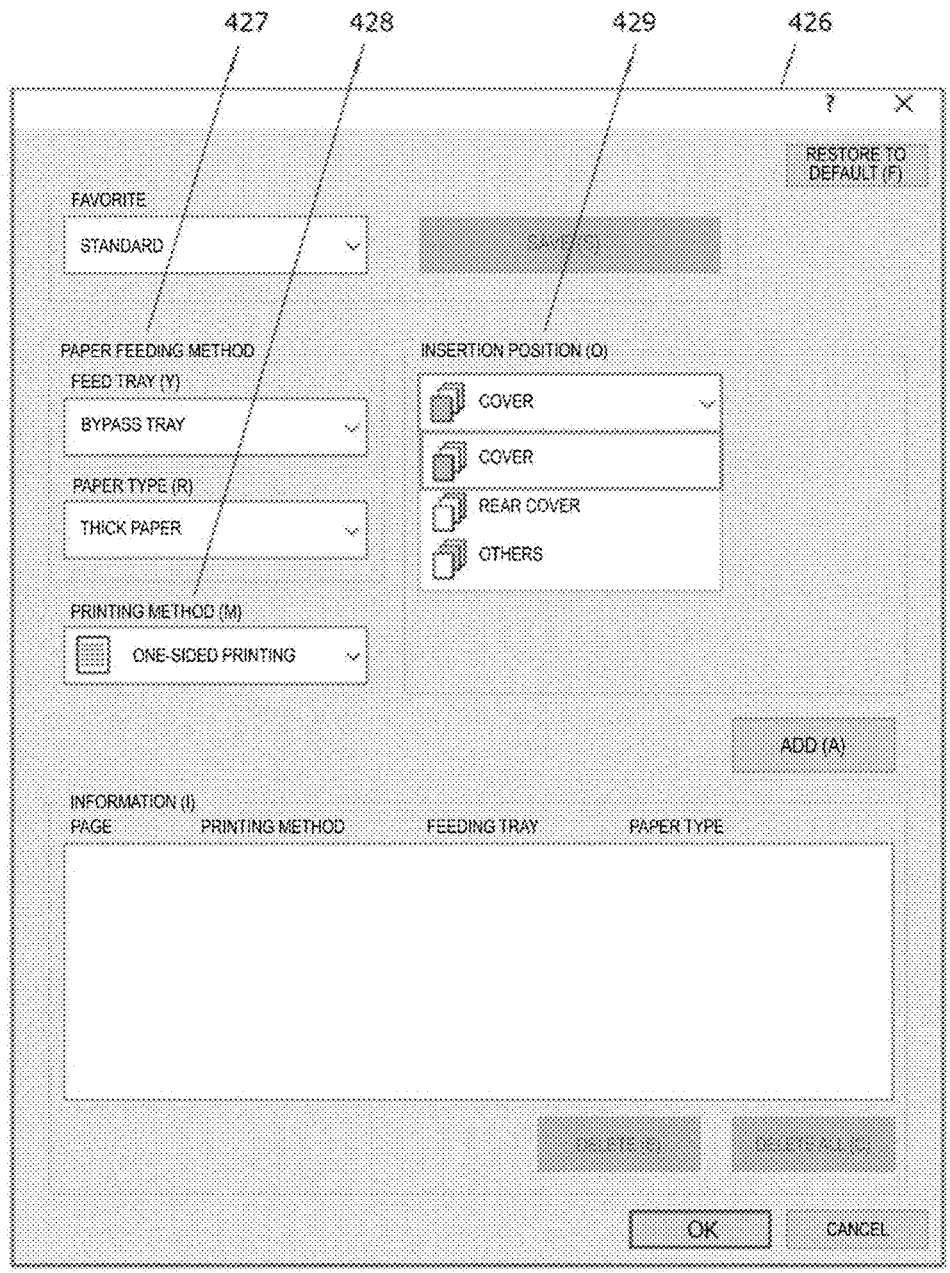
FIG. 11 is an explanatory diagram illustrating an example of a cover/interleaving paper detailed setting screen displayed on the PC operation inputter in FIG. 2.

FIG. 11 illustrates an example of a detailed setting screen 426 that is caused to be displayed by the PC job setter 314 when the [Setting] key 425 is operated. As illustrated in FIG. 11, a paper supply method 427, a printing method 428, and an insertion position 429 are caused to be displayed as cover/interleaving paper setting items that can be set on the detailed setting screen 426. The paper supply method 427 is an item for receiving setting in regard to which of the feed trays the cover or the interleaving paper is to be supplied from and setting of a type of a paper to be supplied as the cover or the interleaving paper. The printing method 428 is an item for receiving setting regarding whether to perform printing on the cover or the interleaving paper and which of one-sided printing or double-sided printing is to be performed in a case where printing is performed. The insertion position is an item for receiving setting regarding which position in the booklet the cover or the interleaving paper is to be inserted into.

In a case where a combination with saddle stitching is not employed, there are options of a front cover, a rear cover, and another option (that is, an interleaving paper) as illustrated in FIG. 11. In a case where a combination with saddle stitching is employed, it is not possible to apply only any one of the front cover and the rear cover, and the options of the front cover and the rear cover are thus integrated into one option (cover).

Figure 12:
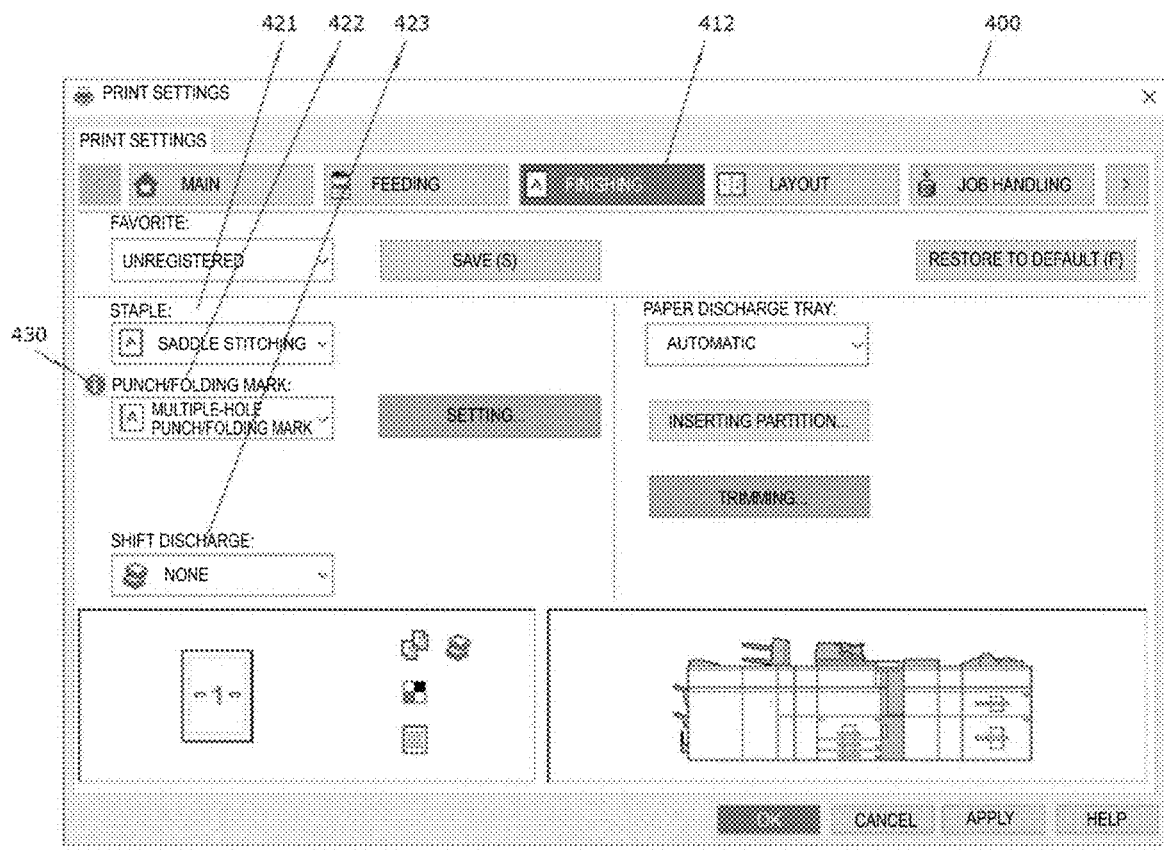
FIG. 12 is an explanatory diagram illustrating an example of a state in which saddle stitch and multiple-hole punch/folding mark settings displayed on the PC operation inputter in FIG. 2 are combined.

FIG. 12 illustrates a state where a combination of saddle stitching and multiple-hole punch/folding mark has been set in a state where the [Insertion] tab 414 on the printing setting screen 400 has been selected.

The PC job setter 314 allows the combination of both only in a case where the cover/interleaving paper has been selected and the pre-processing unit 167 can perform pre-processing of making a folding line. This is because processing as illustrated in FIG. 5 is performed.

In a case where the pre-processing unit 167 cannot perform the processing of making a folding line, that is, in a case where it is possible to perform only the punching processing of a multiple-hole punch, the combination of both is not allowed. This is because there is no need to combine the saddle stitching with the multiple-hole punch. Similarly, a combination of the saddle stitching with the two-hole punch is not allowed. In other words, selection of any one of the saddle stitching and the punch is allowed.

According to this aspect, it is possible to prevent an erroneous combination from being accepted when other processing, for example, of making of the multiple-hole punch or the perforated line is not needed at the center-folded position in the saddle stitching printing.

However, the processing of inhibiting such combinations cannot be realized as long as the PC job setter 314 does not have a function of recognizing whether the pressing member 176 attached to the pre-processing unit 167 is for the multiple-hole punch or for making a folding mark. In that case, the PC job setter 314 allows the combination of the saddle stitching and the multiple-hole punch/folding mark only in a state where the cover/interleaving paper has been selected. The combination with the saddle stitching is allowed even if the pressing member 176 for the multiple-hole punch is attached to the pre-processing unit 167. However, the combination of the saddle stitching with the two-hole punch is not allowed.

Furthermore, the combination of the saddle stitching with the multiple-hole punch/folding line need not be allowed in a case where a thick paper has not been set as a paper type in the paper supply method 427 on the detailed setting screen 426 illustrated in FIG. 11 or in a case where the cover has not been set for the insertion position 429. This will be assumed to be a third embodiment which is different from the basis aspect (first embodiment).

Notification in Case Where Cover/Interleaving Paper and Saddle Stitching Are Combined Fourth Embodiment Although the notification controller 231 is not an essential component in the present disclosure, the notification controller 231 may notify a user of a message indicating that pre-processing is to be performed by the pre-processing unit only on the cover in a case where the combination of the cover/interleaving paper printing and the saddle stitching is set. An aspect including the notification controller 231 is assumed to be a fourth embodiment of the present disclosure.

Figure 13:
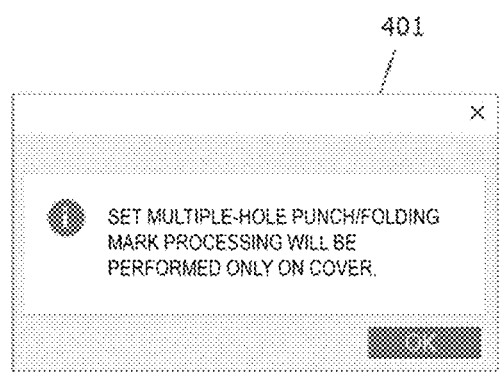
FIG. 13 is an explanatory diagram illustrating an example of a message to be displayed in a case where an information icon is operated on the printer driver screen in FIG. 12.

In the case of the fourth embodiment, the PC job setter 314 causes an information icon 430 to be displayed next to the item name of the punch/folding mark 422 as illustrated in FIG. 12. Once the user operates the information icon 430, the PC job setter 314 causes the PC operation inputter 340 to pop-up display an explanation display screen 401 illustrated in FIG. 13 in response to the operation. This is the explanation "Processing performed by the multiple-hole punch will be carried out only on the cover". The information icon 430 is an icon for causing explanation of a function that cannot be used or a restricted function depending on a combination of setting items to be displayed.

According to the aspect, it is possible to let the user know that the pre-processing will be performed only on the cover as confirmation in a case where the combination of the cover/interleaving paper printing and the aforementioned booklet creation processing is set.

It should be understood that the present disclosure also includes combinations of any of the aforementioned plurality of aspects.

Various modifications of the present disclosure are also possible as well as the aforementioned embodiments. It should not be understood that the modifications do not belong to the scope of the present disclosure. The present disclosure should include all modifications belonging to the meaning equivalent to the scope of the claims and the scope of the present disclosure.

The invention claimed is:

1. A printing system comprising:
   a driver that accepts a user operation related to a setting of a print job and provides an instruction related to the print job;
   a printing unit that performs cover/interleaving paper printing in which printing is performed with at least a cover or an interleaving paper inserted based on the instruction;
   a booklet creating unit that performs booklet creation processing of creating a booklet by center-folding the cover and sandwiching other saddle stitching printed papers or center-folding printed papers based on the instruction; and
   a pre-processing unit that performs a processing of making a linear bending mark or a folding mark, as a pre-processing, at a position on the cover before performing the booklet creation processing, wherein
   in the print job of a combination of the cover/interleaving paper printing and the booklet creation processing, the pre-processing unit makes, during pre-processing, the linear bending mark or the folding mark only on the cover and no other papers than the cover.

2. The printing system according to claim 1, wherein the printing unit, the booklet creating unit, and the pre-processing unit are integrally configured, or at least one of the printing unit, the booklet creating unit, and the pre-processing unit is configured as a separate unit that operates by being connected to other ones of the printing unit, the booklet creating unit, and the pre-processing unit.

3. The printing system according to claim 1,
   wherein the pre-processing unit is able to alternatively execute processing that is different from the pre-processing of making the linear bending mark or the folding mark, and
   a combination of the pre-processing unit and the cover/interleaving paper printing is rejected in a case that the pre-processing unit has been set to perform processing that is different from the pre-processing.

4. The printing system according to claim 1, wherein the pre-processing unit makes the linear bending mark or the folding mark by sandwiching front and rear sides of the cover to be processed with a member having a protruding portion from one side and with a flexible member from the other side, and
in the print job, the pre-processing unit is caused to perform the sandwiching of the cover one or more times.

5. The printing system according to claim 3, wherein in the print job, the pre-processing unit is caused to perform an operation of making the linear bending mark or the folding mark at the position where the cover is center-folded and further at one or more locations near the position.

6. The printing system according to claim 1, further comprising:
an operation inputter that provides an operation screen to a user; and
a communication controller that causes the operation inputter to display a message indicating that the pre-processing unit performs the pre-processing only on the cover in a case where a combination of the cover/interleaving paper printing and the booklet creation processing is set.

7. The printing system according to claim 1, further comprising:
a storage that stores a paper type set or detected by a user, the paper type indicating whether a paper used for printing is a thick paper, wherein
the driver causes the pre-processing unit to perform the processing of making the linear bending mark or the folding mark on the cover only in a case that the paper type of a paper used for the cover indicates to be the thick paper in the print job of the combination of the cover/interleaving paper printing and the booklet creation processing.

8. The printing system according to claim 1, wherein the booklet creation processing performed by the booklet creating unit is one of processing of only center-folding the cover and the other papers, or processing of center-folding the cover and the other papers and stapling a center-folded part.

9. The printing system according to claim 1, wherein the booklet creating unit is a saddle stitching unit that center-folds all papers, including the cover, and binds all the papers, or a bookbinding unit that center-folds one or more sets of papers other than the cover and attaches the center-folded cover to the one or more sets of center-folded papers.

10. An information processing device, in which a driver is installed, that causes an image forming device comprising a printing unit, a booklet creating unit, and a pre-processing unit to execute a print job, wherein
the driver:
causes an operation screen related to a setting of the print job to be displayed;
accepts a user operation;
accepts, on the operation screen, a setting related to center-folding printing in which printed papers are center-folded by using the booklet creating unit and a setting related to cover/interleaving paper printing; and
accepts a setting of combining pre-processing of making a linear bending mark or a folding mark on a cover by using the pre-processing unit with the center-folding printing in a state in which the cover/interleaving paper printing has been selected, or rejects the setting of combining the pre-processing with the center-folding printing in a state in which the cover/interleaving paper printing has not been selected, and
in the pre-processing, the linear bending mark or the folding mark is made only on the cover and no other papers than the cover.

11. A job setting method comprising:
accepting a user operation related to a setting of a print job;
providing an instruction for cover/interleaving paper printing in which printing is performed with at least a cover or an interleaving paper inserted into a printing unit based on the accepted setting;
providing, to a booklet creating unit, an instruction for creating a booklet by center-folding the cover and sandwiching other center-folding printed papers based on the accepted setting; and
providing, to a pre-processing unit, an instruction for performing processing of making a linear bending mark or a folding mark, as pre-processing, at a position on the cover before creating the booklet, wherein
in the pre-processing, the linear bending mark or the folding mark is made only on the cover and no other papers than the cover.

12. The printing system according to claim 1, wherein:
the printing unit supplies the cover and performs printing thereon after supplying each of the other papers, other than the cover, successively, and
performs printing on each of the supplied papers.

* * * * *